United States Patent [19]

Stenberg

[11] 4,303,458
[45] Dec. 1, 1981

[54] METHOD OF JOINING CONDUITS WITH A CONNECTING PIECE AND CONNECTING PIECE FOR USE IN THE METHOD

[75] Inventor: Kaj O. Stenberg, Staffanstorp, Sweden

[73] Assignee: Gambro AB, Sweden

[21] Appl. No.: 190,319

[22] PCT Filed: Jun. 19, 1978

[86] PCT No.: PCT/SE78/00002
§ 371 Date: Feb. 19, 1980
§ 102(e) Date: May 21, 1979

[87] PCT Pub. No.: WO80/00067
PCT Pub. Date: Jan. 24, 1980

[51] Int. Cl.³ .................... B29C 27/02; F16L 47/02
[52] U.S. Cl. .................................. 156/158; 156/273; 156/296; 156/502; 285/150; 285/423
[58] Field of Search .............. 156/158, 272, 273, 296, 156/304.2, 502; 285/423, 150, 260; 271/DIG. 6

[56] References Cited
U.S. PATENT DOCUMENTS

| | | | |
|---|---|---|---|
| 2,079,393 | 5/1931 | Bonge | 264/263 |
| 2,219,266 | 10/1940 | Hirsch | 285/86 |
| 4,179,186 | 12/1979 | Tynes | 156/158 |

FOREIGN PATENT DOCUMENTS

| | | |
|---|---|---|
| 1173232 | 7/1964 | Fed. Rep. of Germany . |
| 1238652 | 4/1967 | Fed. Rep. of Germany . |
| 2628203 | 2/1977 | Fed. Rep. of Germany . |
| 316289 | 10/1969 | Sweden . |
| 857859 | 1/1961 | United Kingdom . |

Primary Examiner—Michael W. Ball
Attorney, Agent, or Firm—Lerner, David, Littenberg & Samuel

[57] ABSTRACT

Conduits (3a, 3b, 3c) are joined with a one-piece tubular connecting piece (1) by inserting support members (5a, 5b, 5c) through a sealable opening (6) in the connecting piece to support the conduit ends while said ends are secured to the connecting piece to communicate with openings (4a, 4b, 4c) in the connecting piece. After securing the conduit ends to the connecting piece, the support members are withdrawn through the sealable opening and that opening is then sealed. The support members can also act as electrodes for welding the conduit ends to the connecting piece, especially when the conduit ends and connecting piece are formed of thermoplastics. The method has particular, but not exclusive, application to smoothly connecting tubes for conveying blood.

20 Claims, 4 Drawing Figures

METHOD OF JOINING CONDUITS WITH A CONNECTING PIECE AND CONNECTING PIECE FOR USE IN THE METHOD

TECHNICAL FIELD

The invention relates to and provides a method of joining two or more conduits with a tubular connecting piece wherein ends of the conduits are located at respective openings in the connecting piece and are secured to said connecting piece to communicate with the respective openings. The invention also provides a tubular connecting piece for use in the method. The invention has particular, but not exclusive, application to welding thermoplastics tubes to a thermoplastics connecting piece.

BACKGROUND ART

It is well known to join two or more conduits with a tubular connecting piece by locating the conduit ends to be connected at respective openings in the connecting piece and securing said ends to the connecting piece to communicate with the respective openings. In particular, this method is used to connect thermoplastics tubes by welding the tubes to a thermoplastics connecting piece. The conduit ends required supporting whilst being secured to the connecting piece and it is known to provide this support by inserting support means into the connecting piece through one of the openings for a conduit end. Obviously, however, it has not been possible to support all of the conduits from inside the connecting piece because the support means must be withdrawn from said opening to allow the respective conduit end to be connected to the connecting piece to communicate with said opening. It is an object of the present invention to provide a method whereby all of the conduit ends can be supported from inside the connecting piece whilst they are secured to the connecting piece.

DISCLOSURE OF INVENTION

According to one aspect of the present invention, there is provided a method of joining two or more conduits with a one-piece tubular connecting piece wherein the ends of the conduits are located at respective openings in the connecting piece and are secured to said connecting piece to communicate with the respective openings, characterised in that support means is inserted through a sealable opening in the connecting piece to support at least one conduit end at the respective opening, said at least one conduit end is secured to the connecting piece whilst being supported by said support means, the support means is withdrawn through said sealable opening, and the sealable opening is then sealed.

The conduit ends can be secured to the connecting piece by any of the means conventionally used for connecting conduits to a connecting piece but it is preferred that they are welded to the connecting piece. Advantageously, the conduit ends and/or the connecting piece are formed of thermoplastics. As mentioned previously, the invention has particular application to the joining of thermoplastics tubes with a thermoplastics connecting piece. Suitable thermoplastics include polyvinylchloride and polyurethane.

The support means usually, but not necessarily, will be used to support all of the conduit ends during the time that they are being secured to the connecting piece. It will be appreciated however that the conventional method of inserting support means through an opening intended for communication with a conduit end can be employed for all except the last conduit end and the method of the invention used for securing that last conduit end to the connecting piece.

According to a second aspect of the present invention, there is provided a one-piece tubular connecting piece for use in the method of the invention having two or more openings adapted to be secured to respective conduit ends, characterised in that the connecting piece has a sealable opening adapted to receive support means for supporting at least one conduit end at the respective opening whilst said at least one conduit end is secured to the connecting piece to communicate with the respective opening and to permit withdrawal of said support means after the said at least one conduit end has been so secured to the connecting piece.

Advantageously, the sealable opening is a slot and preferably the connecting piece is elongate and the slot extends longitudinally of the elongate connecting piece.

Flaps preferably are provided integrally with the connecting piece for use in sealing the sealable opening. When the said opening is a slot, two flaps suitably are provided to extend longitudinally at the respective sides of the slot. These two flaps preferably have plane-convex opposed (i.e. facing) surfaces whereby the said surfaces smoothly mutually diverge outwardly from the slot. It is also preferred that any flaps integral with the connecting piece are formed of thermoplastics so that the opening can be sealed by heating and pressing the flaps together over the opening.

Usually, the openings in the connecting piece for communication with the conduits will be tubular end portions of the connecting piece and the conduit ends will be inserted into or placed over the respective tubular end portions of the connecting piece.

The sealable opening can be located at any convenient position in the connecting piece but suitably is located opposite an opening for a conduit end to facilitate insertion of the support means into that opening.

The connecting piece can be of any suitable shape provided that it serves to connect the conduits together in the required manner. Advantageously however, the central axis of tubular end portions are substantially coplanar and the connecting piece has a "Y" or "T"-shaped axial section in said plane.

Conveniently, the support means constitutes at least one electrode for use in welding the respective conduit end to the connecting piece.

BRIEF DESCRIPTION OF DRAWINGS

The following is a description, by way of example only and with reference to the accompanying drawings of the presently most preferred embodiment of the method and apparatus aspects of the invention. In the drawings.

BEST MODE OF CARRYING OUT THE INVENTION

Figure 1:
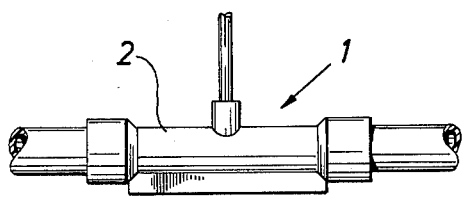
FIG. 1 is a side view of a connecting piece according to the most preferred embodiment of the invention having three tubes welded to tubular ends of the connecting piece.
Figure 2:
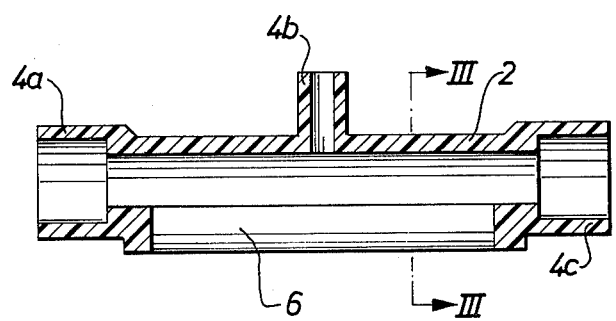
FIG. 2 is an enlarged axial section of the connecting piece of FIG. 1, but without the tubes welded thereto.

Referring to FIGS. 1 to 4, a connecting piece, designated 1, comprises a tubular portion 2 having three open tubular ends 4a, 4b, 4c. The tubular portion 2 is provided with a hole 6, through which three support members 5a, 5b, 5c are intended to be inserted into the connecting piece 1 so as to support tubes 3a, 3b, 3c when these are being welded to the connecting piece.

Figure 3:
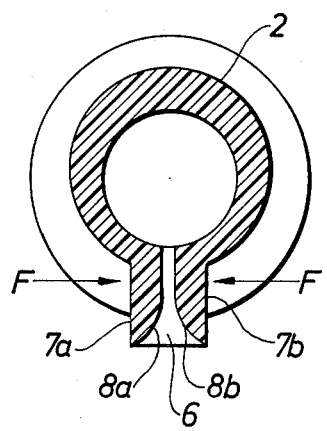
FIG. 3 is a further enlarged cross-section of the connecting piece along the line III—III in FIG. 2.

The hole 6, which is sealable, is a longitudinal slot and is provided opposite to the open tubular end 4b. The hole 6 has two parallel, longitudinal flaps 7a, 7b extending along its respective edges as shown in FIG. 3. These flaps are each integrally formed with the tubular portion 2 and have plane-convex surfaces 8a and 8b, respectively, facing each other, whereby said surfaces smoothly mutually diverge radially outwardly from the slot 6. The outer surfaces of the respective flaps 7a, 7b are planar.

The axes of the open tubular ends 4a, 4b, 4c are provided in the same plane and so that the tubular portion 2 has a T-shaped axial section in said plane.

The connecting piece 1 as well as the respective tubes are made of a weldable thermoplastic material, for example polyurethane and preferably polyvinylchloride (PVC).

As shown in FIG. 3 the tubular portion 2 is somewhat thicker just opposite to the hole 6 in order to increase the strength of the portion 2.

Figure 4:
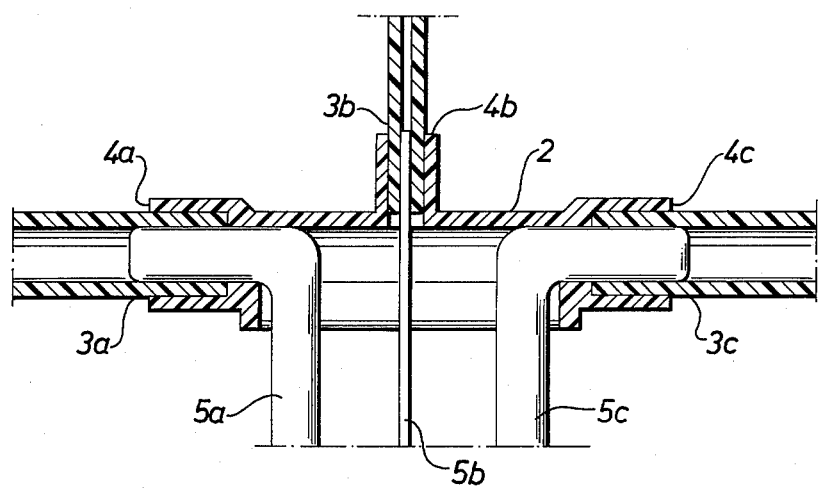
FIG. 4 is a corresponding axial section to FIG. 2 of the connecting piece of FIG. 1, but with the respective tubes being arranged in the tubular ends of the connecting piece while being supported by supporting means.

In welding together the respective end portions of the tubes 3a, 3b, 3c to the corresponding open tubular ends 4a, 4b, 4c of the connecting piece 1 in accordance with the present invention, separate supporting members 5a, 5b, 5c are inserted into the tubular portion 2 through the sealable hole 6 to be received in the respective tubes. It is to be noticed that these supporting members (which together constitute support means) can be inserted into the tubular portion 2 at the same time, whereby all the tubes can be supported simultaneously. The supporting members 5a, 5b, 5c are so dimensioned that, in place within the tubular portion, as is shown in FIG. 4, they are closely surrounded by the tubes 3a, 3b, 3c. In that way there is provided sufficient support to the tubes.

In high frequency welding, which is the most preferred welding method according to the present invention, these supporting means may be the welding electrodes. The other electrodes (not shown), are constituted by conventional brass jaws, which externally surround the respective open tubular ends 4a, 4b, 4c of the connecting piece 1.

When the tubes as well as the welding electrodes, inclusive of the separate supporting members 5a, 5b, 5c, are in place, all the tubes can be welded simultaneously to the respective open tubular ends 4a, 4b, 4c of the connecting piece 1.

When the tubes have been welded to the tubular ends 4a, 4b, 4c of the connecting piece, the supporting members 5a, 5b, 5c are withdrawn, and the hole 6 is then sealed. The sealing is preferably performed by welding, wherein jaws (not shown) or the like, acting as electrodes, press the longitudinal flaps 7a, 7b against each other, as is shown by arrows F in FIG. 3. The flaps 7a, 7b are melted together due to the heat generated during the welding. Molten material flows radially outwardly (downwardly in FIG. 3) along the plane-convex surfaces 8a, 8b of the flaps and not into (upwardly in FIG. 3) the tubular portion 2 through the hole 6. This is due to the fact that the surfaces 8a, 8b have the plane-convex shape shown in FIG. 3. As a result there is obtained a connecting piece which, since the hole has been sealed, has smooth inner surfaces without any sharp edges.

INDUSTRIAL APPLICABILITY

A preferred application of the invention will be the connecting of a heparine tube to a blood tube via a connecting piece in medical devices for, for example, extracorporeal treating of blood. In this case it is very important that the connecting piece with the tubes in place does not display any irregularities in the flow path of the blood. Sharp edges or substantially altered flowing conditions, which may lead to substantial turbulence, can be deleterious to the blood. According to the present invention there can be obtained a connecting piece without any irregularities or the like which may lead to deleterious turbulence in the blood stream.

It will be appreciated that the invention is not restricted to the details described above but that numerous modifications and variations can be made without departing from the scope of the invention as claimed in the following claims. For example, instead of the tubes 3a, 3b, 3c being inserted into the tubular ends 4a, 4b, 4c of the connecting piece 1 they can be welded to the connecting piece outside the end portions 4a, 4b, 4c thereof. In such a case the tubes 3a, 3b, 3c are slipped over the connecting piece 1 at the tubular end 4a, 4b, 4c portions thereof and are welded to said portions outside the connecting piece. Further, the connecting piece can be of a different shape, for example the tubular portion 2 can have a "Y"-shape in the plane of the axes of the tubular ends 4a, 4b, 4c instead of the "T"-shape shown.

I claim:

1. A method of joining two or more conduits by employing a one-piece tubular connecting member, said connecting member including at least two conduit-receiving openings and a separate sealable opening which includes flaps, comprising the steps of:
    locating one end of each conduit at respective ones of said conduit-receiving openings in said connecting member;
    inserting support means through said separate sealable opening in said connecting member to support at least one conduit end at a respective conduit-receiving opening;
    securing said at least one conduit end to said connecting member while said at least one conduit end is being supported by said support means;
    withdrawing said support means from said sealable opening; and
    sealing said sealable opening by sealing said flaps to each other.

2. The method of claim 1, wherein said support means includes at least two support members, and wherein the step of inserting includes inserting said two support members through said sealable opening to simultaneously support at least two conduit ends at said respective conduit-receiving openings.

3. The method of claim 2, wherein the step of securing includes simultaneously securing said at least two conduit ends to said connecting member.

4. The method of claim 1, wherein the step of securing is performed by welding said at least one conduit end to said connecting member.

5. The method of claim 1, wherein either of said connecting member or said at least one conduit end is formed of thermoplastic material, and said securing step is performed by heating and melting said thermoplastic material.

6. The method of claim 1, wherein said sealable opening is a slot, and wherein the step of sealing includes sealing the sides of said slot to each other.

7. The method of claim 1, wherein said flaps are formed of thermoplastic material, and wherein the step of sealing includes heating and pressing said flaps together to seal said opening.

8. The method of claim 4, wherein said support means includes at least one electrode, and wherein the step of welding includes using said electrode to weld said at least one conduit end to said connecting member.

9. The method of claim 1, wherein the step of locating includes inserting at least one conduit end into a respective one of said conduit-receiving openings in said connecting member.

10. The method of claim 1, wherein the step of locating includes surrounding at least one of said conduit-receiving openings with one of said conduit ends.

11. A one-piece tubular connecting member for joining two or more conduits, comprising:

said connecting member including at least two conduit-receiving openings, each for receiving one end of a conduit;

said connecting member including a separate sealable opening for receiving support means for supporting at least one conduit end at a respective conduit-receiving opening while said at least one conduit end is being secured to said connecting member and for permitting withdrawal of said support means; and said sealable opening including means for sealing the sides thereof together after the withdrawal of said support means, said means for sealing including flaps formed integrally with said connecting member for sealing the opening.

12. A connecting member according to claim 11, wherein said sealable opening is a slot.

13. A connecting member according to claim 12, wherein said connecting member is of an elongated construction including a longitudinal axis, and said slot extends in the direction of said longitudinal axis.

14. A connecting member according to claims 12 or 13, wherein said sealable opening includes two flaps which extend longitudinally along respective sides of said slot for sealing said slot.

15. A connecting member according to claim 14, wherein said flaps include surfaces which face each other having a convex shape so that said surfaces diverge outwardly from said slot.

16. A connecting member according to claim 11, wherein said sealable opening is located opposite one of said conduit-receiving openings.

17. A connecting member according to claim 11, wherein said conduit-receiving openings are tubular end portions and wherein said conduits are tubes, and said tubular end portions are adapted to surround said conduit tubes.

18. A connecting member according to claim 17, wherein the central axes of said tubular end portions are substantially coplanar, and said connecting member has a T-shaped configuration in said plane.

19. A connecting member according to claim 17, wherein the central axes of said tubular end portions are substantially coplanar, and said connecting member has a Y-shaped configuration in said plane.

20. A connecting member according to claim 11, formed of thermoplastic material.

* * * * *